Figure 1:
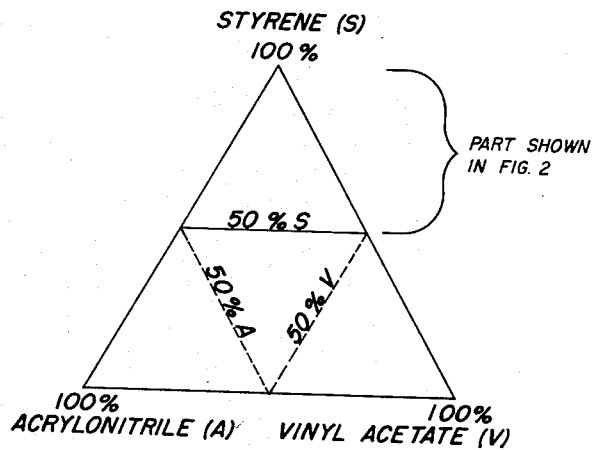

July 31, 1956

R. J. SLOCOMBE 2,757,165

VINYL ACETATE/ACRYLONITRILE/STYRENE TERPOLYMERS

Filed Sept. 2, 1954

2 Sheets—Sheet 1

STYRENE / ACRYLONITRILE /
VINYL ACETATE TERPOLYMERS
WT. %

INVENTOR.
R. J. SLOCOMBE

BY *John D. Upham*
ATTORNEY

July 31, 1956   R. J. SLOCOMBE   2,757,165
VINYL ACETATE/ACRYLONITRILE/STYRENE TERPOLYMERS
Filed Sept. 2, 1954   2 Sheets-Sheet 2

INTERPOLYMER COMPOSITIONS
BY MOLE PER CENT

INVENTOR.
R. J. SLOCOMBE
BY
ATTORNEY.

United States Patent Office 2,757,165
Patented July 31, 1956

2,757,165
VINYL ACETATE/ACRYLONITRILE/STYRENE TERPOLYMERS

Robert J. Slocombe, Dayton, Ohio, assignor to Monsanto Chemical Company, St. Louis, Mo., a corporation of Delaware Application September 2, 1954, Serial No. 453,737

17 Claims. (Cl. 260—80.5)

This invention relates to interpolymers of the nature of terpolymers, i. e., interpolymers prepared by polymerizing a monomeric mixture consisting of three different monomeric components. In specific aspects the invention pertains to interpolymers of (a) as least one monomer selected from the group consisting of styrene, vinyltoluene and vinylxylene, (b) acrylonitrile, and (c) vinyl acetate, (a) being considered for purposes of the invention as a single monomeric component even though it may be a mixture of any two or more of the monomers named in (a). Other aspects of the invention relate to improved methods of preparing clear terpolymers.

It is by now well known that ethylenically unsaturated monomers differ greatly in their polymerization reactivity toward each other. There are in fact some monomers that will not undergo homopolymerization at all, i. e., polymerization of two or more molecules of the same monomer to form a polymer of that monomer, yet will readily undergo interpolymerization with certain other monomers. On the other hand, certain monomers each of which readily undergoes homopolymerization, inhibit each other when attempts are made to interpolymerize such monomers; styrene and vinyl acetate are examples of this behavior, since each readily homopolymerizes, yet the two monomers inhibit each other when brought together in a single monomeric mixture. Interpolymerization affords a method of imparting varying characteristics to a polymer, and in many instances such characteristics cannot be obtained by mere physical admixture of two or more homopolymers. However, because of the above-mentioned differences in reactivity among monomers toward each other, marked heterogeneity is the rule in interpolymers and only under special circumstances can an interpolymer be obtained that is of sufficient homogeneity to give a transparent or clear interpolymer. While some objectionable properties such as color, encountered in interpolymers, can often be avoided by means such as the use of stabilizers or lower polymerization temperatures, incompatibility manifested by haze, turbidity, or opacity in plastics is not overcome by such treatment.

If a monomeric mixture is subjected to polymerization and the initial increment of polymer is segregated before the polymerization is allowed to go forward to an appreciable extent, it is frequently possible to obtain a clear interpolymer, but the commercial impracticability of such a procedure is apparent. On the other hand, if polymerization is permitted to proceed to a considerable and especially to a high degree of conversion, the more reactive monomer enters into the polymer to a greater extent than a less reactive monomer or monomers with the consequence that residual unreacted monomer becomes more and more depleted in the more reactive monomer, while the polymer being formed in the latter stages of polymerization is deficient in the more reactive monomer. There results a polymeric material which is made up of a variety of polymer molecules running a gamut of compositions such that the total polymer is heterogeneous with resultant opacity and often greatly impaired physical properties. This phenomenon, resulting in an undesirable product, can be overcome to an appreciable but limited extent by gradually adding during the course of the polymerization the more reactive monomer at a rate aimed at keeping the composition of unreacted monomeric mixture essentially constant. As a practical matter it is extremely difficult to approach uniformity in such an operation, and it is impossible to use this technique at all in the case of mass (bulk) polymerization in which the polymerization reaction mixture sets up into semi-solid or solid polymer after the reaction is only partly completed so that further access of added monomer to the total mixture cannot be obtained.

Copolymers of styrene and acrylonitrile are well known. They have been made from all sorts of proportions of the two monomers. Those of a comparatively high styrene content have found considerable commercial favor, as they are hard tough polymers. The tough and horny quality of such materials, while advantageous for some uses, is of course a disadvantage for other uses. Further, the rate at which styrene and acrylonitrile copolymerize is quite fast, and it has been found very difficult to prevent an exothermic temperature rise within the reaction mixture, especially when the styrene and acrylonitrile are being subjected to mass (bulk) copolymerization, i. e., copolymerization in the absence of any inert liquid reaction medium that is a solvent or a non-solvent for the monomer and/or polymer.

In the accompanying drawings, forming part of the present specification:

Figure 1 is an outline of a triangular coordinate graph on which all possible proportions of styrene, acrylonitrile, and vinyl acetate can be plotted.

Figure 2:
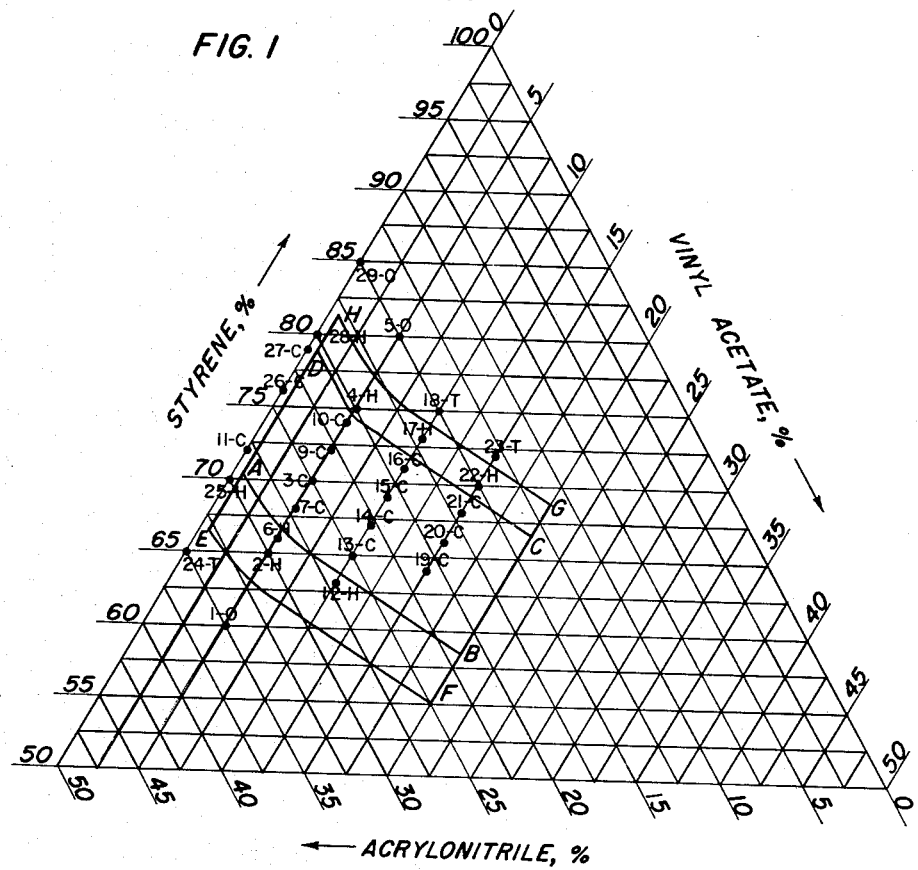

Figure 2 is a triangular coordinate graph of the nature obtainable by taking only the upper half of Figure 1, so that Figure 2 covers all possible proportions of styrene, acrylonitrile, and vinyl acetate wherein the styrene content is at least 50 weight per cent. The preferred and broad proportions of the three named monomers which are polymerized in accordance with the present invention, expressed as weight percentages, are shown on Figure 2. Figure 2 also shows the appearance of polymers prepared by batch polymerization of a variety of monomeric mixtures falling within and without the scope of the present invention, as described in detail in the specific examples.

Figure 3:
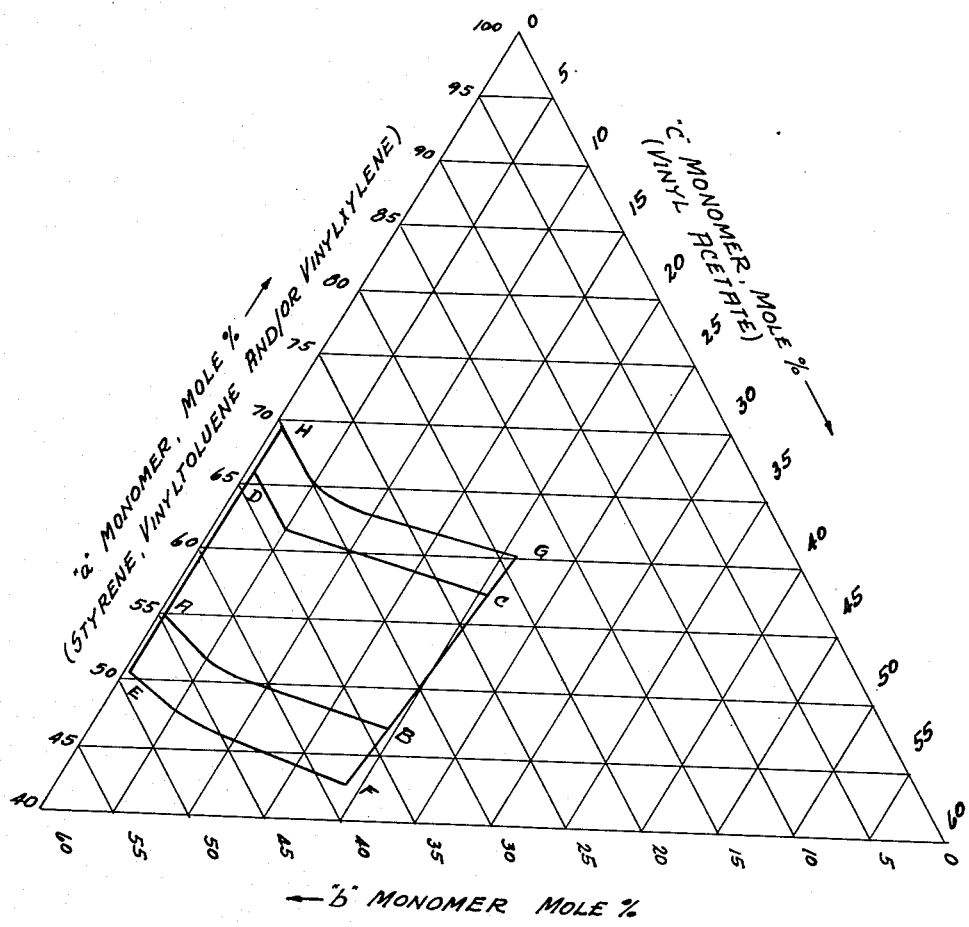

Figure 3 is a triangular coordinate graph on which all possible proportions of (a) styrene, vinyl toluene and/or vinyl xylene taken singly or collectively as the case may be as one component, (b) acrylonitrile as a second component, and (c) vinyl acetate as a third component, can be plotted, wherein the (a) component is at least 40 mole per cent. The preferred and broad proportions of (a), (b) and (c) shown on Figure 3 correspond exactly to the same on Figure 2, except that proportions are expressed on Figure 3 as mole percentages.

In accordance with preferred embodiments of the present invention, I subject to free-radical-initiated batch interpolymerization a monomeric mixture consisting of essentially styrene, acrylonitrile, and vinyl acetate. (Any part or all of the styrene can be substituted by vinyltoluene and/or vinylxylene.) However, the relative proportions of the three monomers must be carefully selected in order to avoid the formation of polymer products that are apaque or turbid in appearance. I have found that an extremely large proportion of all of the possible monomeric mixtures consisting of these three monomers are incapable of yielding satisfactory products. The present invention subjects to batch polymerization a monomeric styrene/acrylonitrile/vinyl acetate mixture whose composition lies within the approximate area ABCD as shown on the triangular coordinate graph which constitutes Figure 2 or Figure 3 (these being the same when (a) consists of styrene with the exception that Figure 2 expresses weight per cent and Figure 3 expresses mole per cent). If the proportions of the three monomers are chosen from the said ABCD area, and only if so chosen, the resulting polymeric product is clear. Less preferably, the invention in its broader aspects permits choice of the monomeric compositions from a somewhat broader area approximately designated EFGH in Figures 2 and 3. The proportions lying within EFGH but outside of ABCD areas produce polymers that, while not clear, are only hazy and thus have value and uses where some haziness is permissible, for example in blends with other polymers. Polymers made from monomeric mixtures whose compositions lie outside the named areas are turbid or opaque. The said areas are limited to from 0.5 to 20 weight per cent vinyl acetate, since percentages of vinyl acetate less than 0.5 weight per cent seldom have much advantage over styrene/acrylonitrile copolymers free from vinyl acetate, and polymers made from the three monomers wherein the proportion of vinyl acetate is greater than 20 weight per cent have too high an alcohol (methanol) solubles content, i. e., too high a content of unreacted monomer and/or very low molecular weight polymers, for most purposes.

The most preferred polymers of the present invention are prepared by subjecting to batch polymerization a monomeric styrene/acrylonitrile/vinyl acetate mixture whose composition lies within the approximate area ABCD on Figure 2 with the further proviso that the vinyl acetate content of the mixture is within the range of 5 to 15 weight per cent.

My styrene/acrylonitrile/vinyl acetate terpolymers are softer than styrene/acrylonitrile copolymers made from comparable proportions of styrene and acrylonitrile, and this softness is an advantage for many uses; thus, my terpolymers form more flexible films than those formed from the styrene/acrylonitrile copolymers. Further, the vinyl acetate present in the monomeric mixtures which are used tends to slow the polymerization rate, and thus minimizes the heat removal difficulties previously referred to. It is also possible to prepare polymers, containing styrene and acrylonitrile together with vinyl acetate, of controlled molecular weight by selecting the proper vinyl acetate content within the ranges which the invention permits; in general, the higher the vinyl acetate content of the monomeric mixture the lower the molecular weight. However, all the terpolymers of this invention are of high molecular weight as understood in the polymer art. It is apparent that the present invention makes possible the production of clear terpolymers with obvious attendant advantages, especially in films and molded articles made from the terpolymers.

By the present invention I can subject a given monomeric mixture consisting of the three monomers, selected as described herein, to a batch polymerization and carry the polymerization reaction to complete or essentially complete, say 90 to 100 per cent, conversion of the total monomers and yet obtain a clear solid resinous terpolymer. If desired, the polymerization can be stopped at any point short of completion so long as polymerization conditions are such as to produce solid terpolymer, but this is not necessary in order to obtain a clear terpolymer and would seldom be advantageous. The higher the degree of conversion of monomeric mixtures, the greater the advantages of my invention. This is because the greatest extent of heterogeneity is found with essentially complete conversion to polymers. A high conversion, i. e., at least 50 weight per cent conversion and preferably at least 80 weight per cent conversion, is preferred in practicing the invention. However, some of the benefits of the invention may be realized even where the percentage conversion is as low as 20 per cent. With very low conversions, the polymer formed tends to approach the perfect homogeneity existing in the first infinitely small increment of polymer formed. As pointed out above, commercial practicality requires that conversion be carried to a value more than a few per cent, hence introducing the lack of homogeneity which up to now, the art has not known how to avoid. It is to be recognized that the extent of the area of clear, or at the most hazy, terpolymers, is somewhat dependent on the percentage conversion, the areas shown in Figure 2 being somewhat expanded for the lower percentage conversions, to an extent that will be readily determined by those skilled in the art having had the benefit of the present disclosure.

The invention is broadly applicable to any free-radical-initiated interpolymerization of three-component monomeric mixtures containing the monomer combinations and in the proportions set forth herein, provided the polymerization is carried out by a batch procedure. By this it is meant that all of the monomeric materials to be employed are introduced simultaneously in the desired proportions into the polymerization reaction system. Ordinarily a single charge of monomeric materials will be placed in a reaction vessel and the single charge subjected to polymerization conditions until the polymerization is substantially complete. However, it is not outside the scope of my invention to introduce continuously a monomeric mixture containing the three monomers in fixed proportions into a flow-type polymerization system, whereby the initial polymerizable mixture passes away from its point of introduction and ultimately is recovered as polymer. This can be accomplished by continuous flowing of the monomeric mixture into the first of a series of polymerization reaction vessels with continuous flow of reaction mixture from one vessel to another along a series of two or more such vessels with ultimate recovery of polymer from the last in the series. Those skilled in the art will understand that this operation is essentially a batch operation in the sense that additional monomeric material of composition different from the original mixture is not introduced into a partially polymerized material. Thus, the term "batch polymerization," as used herein, means a polymerization which does not involve the gradual or incremental or subsequent addition of a monomer or monomers having a composition different from the initial monomeric mixture.

The invention is perhaps most advantageously effected by the mass or bulk polymerization procedure. In such procedure the reaction mixture is free from added solvent or other reaction medium and consists solely of monomers, resultant polymers, and catalyst and regulator, if any. An important advantage of the invention is that such a mass polymerization can be effected to produce a clear terpolymer in a situation in which it is impossible to use the gradual monomer addition technique discussed above.

If desired, the interpolymers of the present invention can be made by the suspension or the emulsion polymerization techniques. For suspension polymerization a reaction medium such as water is used together with small amount of suspending agent, for example tricalcium phosphate, carboxymethylcellulose, vinyl acetate/maleic anhydride copolymer derivatives, etc., to give a suspension of particles of initial monomeric mixture, which particles are not of such small size as to result in a permanently stable latex. Where the particles are of quite large size, this type of polymerization is often called "pearl" polymerization. To effect emulsion polymerization, sufficient amount of emulsifying agent, for example a water-soluble salt of a sulfonated long chain alkyl aromatic compound, a surface active condensation product of ethylene oxide with long chain aliphatic alcohols or mercaptans, etc., is employed along with vigorous agitation whereby an emulsion of the reactants in water is formed and the product is obtained in the form of a latex. The latex can then be coagulated if desired by known methods and the polymer separated from the water. For some applications the latex can be employed directly as for example for forming a film, and the resulting film after evaporation of the water will be clear when the polymers are made in accordance with the present invention. The emulsion technique has certain advantages particularly in that a very high degree of conversion of the monomers is obtained with considerable rapidity, since the heat of reaction is easily carried off by indirect heat exchange with the reaction mixture which contains a considerable proportion of water. Such polymerizations are often effected with redox-type catalyst systems at moderate temperatures of say 60° C. on down to 0° C. and below.

The polymers of the present invention can also be made in the presence of an added organic solvent. It should be recognized however that the presence of such a solvent ordinarily results in a polymer of lower molecular weight than that obtained in the absence of the solvent.

Conventional recipes and procedures for effecting mass, solvent, suspension and emulsion polymerizations are so well known to those skilled in the art that they need not be further detailed here.

From the foregoing, it will be apparent that the term, "monomeric mixture," as used in the claims refers only to the polymerizable monomeric materials used in the process, and that additionally solvents, aqueous reaction media, catalyst, etc., can be present or not in the reaction mixture as may be desired in any particular case. In other words, in the claims "monomeric mixture" is not necessarily synonymous with "reaction mixture."

Polymerization can be effected by any of the well-known free-radical mechanisms. The polymerization is initiated and carried on by virtue of free radicals, which can be derived from the monomers themselves on simple heating of the monomeric mixture to a suitable temperature, or can be derived from added free-radical-supplying catalysts, especially the "per" compounds and the "azo" compounds, or can be derived by ultraviolet or other irradiation of the reaction mixture with or without the presence of photosensitizers, e. g., organic disulfides. The examples set forth hereinafter describe "thermal" polymerizations in which the polymerization reaction was initiated and maintained merely by heating the monomeric mixture in the absence of any added catalyst. In many instances it will be desired to add a suitable polymerization catalyst, in which case sufficient catalyst is employed to give a desired reaction rate. Suitable catalysts are of the free-radical-promoting type, principal among which are peroxide-type polymerization catalysts, and azo-type polymerization catalysts. Those skilled in the art are now fully familiar with a large number of peroxide-type polymerization catalysts and a suitable one can readily be chosen by simple trial. Such catalysts can be inorganic or organic, the latter having the general formula: R'OOR", wherein R' is an organic radical and R" is an organic radical or hydrogen. These compounds are broadly termed peroxides, and in a more specific sense are hydroperoxides when R" is hydrogen. R' and R" can be hydrocarbon radicals or organic radicals substituted with a great variety of substituents. By way of example, suitable peroxide-type catalysts include benzoyl peroxide, ditertiary butyl peroxide, tertiary butyl hydroperoxide, diacetyl peroxide, diethyl peroxycarbonate, 2-phenyl propane-2-hydroperoxide (known also as cumene hydroperoxide) among the organic peroxides; hydrogen peroxide, potassium persulfate, perborates and other "per" compounds among the inorganic peroxides. The azo-type polymerization catalysts are also well-known to those skilled in the art. These are characterized by the presence in the molecule of the group —N=N— bonded to one or two organic radicals, preferably at least one of the bonds being to a tertiary carbon atom. By way of example of suitable azo-type catalysts can be mentioned α,α' - azodiisobutyronitrile, p - bromobenzenediazonium fluoborate, N-nitroso-p-bromoacetanilide, azomethane, phenyldiazonium halides, diazoaminobenzene, p-bromobenzenediazonium hydroxide, p-tolyldiazoaminobenzene. The peroxy-type or azo-type polymerization catalyst is used in small but catalytic amounts, which are generally not in excess of one per cent by weight based upon the monomeric material. A suitable quantity is often in the range of 0.05 to 0.5 per cent by weight.

Photopolymerization is another suitable procedure for carrying out the present invention. This is ordinarily accomplished by irradiating the reaction mixture with ultraviolet light. Any suitable source of light is employed having effective amounts of light with wave lengths of 2,000 to 4,000 Angstrom units. The vessel in which the polymerization is conducted should be transparent to light of the desired wave length so that the light can pass through the sides of the container. Suitable glasses are available commercially and include borosilicate ("Pyrex"), "Vycor," and soft glass. Alternatively, the source of light can be placed directly over the surface of the monomer in a container or can be placed within the reaction mixture itself. In some instances it is helpful to add a material that can be termed a photosensitizer, i. e., a material which increases the rate of photopolymerization, for example organic disulfides as described in U. S. Patent No. 2,460,105.

Choice of a suitable temperature for a given polymerization will readily be made by those skilled in the art having been given the benefit of the present disclosure. In general, suitable temperatures will be found within the range of 0° C. to 200° C., although temperatures outside this range are not beyond the scope of the invention in its broadest aspects. The time required for maximum polymerization will depend not only upon the temperature but also upon the catalyst if any is employed, the ability of the system to remove heat of polymerization, and the particular monomers employed. The example set forth hereinafter gives some illustrative information as to reaction times for particular polymerizations.

The term "triangular coordinate graph" as used herein is well understood. The accompanying figures are examples of such graphs and the use of same. However, for the sake of completeness the following statement can be made concerning the character of such triangular graphs. The graph is an equilateral triangle, divided off by three series of parallel lines each series being parallel to one side of the triangle. The distance between an apex of the triangle and the side opposite that apex represents variations in percentages of the component designated by that apex varying from 100 per cent to 0 per cent in equal increments running from the apex to the opposite side of the triangle. For example, if the distance between the apex and the side of the triangle opposite the apex is divided into 100 equal parts by lines passing across the triangle and parallel to said side, each line represents 1 per cent of the component for which that apex is designated. Thus, any point within the triangle represents a single three-component composition, the indicated percentages of the three components totaling 100 per cent. As pointed out before, Figure 2 represents the upper half of a complete triangular coordinate graph in which each apex represents 100 weight per cent of the given monomer, so that in Figure 2 the top apex represents 100 weight per cent styrene but the lower left apex represents 50 weight per cent acrylonitrile and the lower right apex represents 50 weight per cent vinyl acetate. Similarly, Figure 3 represents only a portion of a complete triangular coordinate graph, the top apex representing 100 mole per cent ($a$) but the lower left apex representing 60 mole per cent ($b$) and the lower right apex representing 60 mole per cent ($c$).

The invention is particularly directed to terpolymer prepared by a free-radical-initiated batch polymerization of a monomeric mixture consisting of ($a$) at least one monomer selected from the group consisting of styrene, vinyltoluene and vinylxylene, ($b$) acrylonitrile and ($c$)

vinyl acetate, the proportions of the (a), (b), and (c) monomers in said monomeric mixture being within the approximate area EFGH in Figure 2, said EFGH area being recalculated for any (a) monomer other than styrene to give weight percentages of such (a) monomer that are the same mole percentages as the mole percentages of styrene represented by styrene weight percentages in said Figure 2. Stated another way with exactly the same meaning but more succinctly, and with direct reference to mole percentages, the invention is particularly directed to interpolymer prepared by free-radical-initiated batch polymerization of a monomeric mixture consisting of (a) a member of the group consisting of styrene, vinyltoluene, vinylxylene, and mixtures thereof, (b) acrylonitrile and (c) vinyl acetate, the proportions of (a), (b) and (c) in said monomeric mixture being within the approximate area EFGH in Figure 3. It will be noted that the invention is described herein with principal reference to styrene. Styrene is generally preferred, particularly because of its ready availability and low cost. However, any part or all of the styrene can be substituted by vinyltoluene and/or vinylxylene. The word "vinyltoluene" is used generically as inclusive of each of the nuclear-substituted-methyl styrenes, i. e., o-methylstyrene, m-methylstyrene, and p-methylstyrene. Similarly, "vinylxylene" is used generically as inclusive of each of the various isomers obtainable by substituting styrene with two methyl groups on the aromatic nucleus. When the (a) monomer is not styrene, but rather is any one or a mixture of two or more of the vinyltoluenes, or is any one or a mixture of two or more of the vinylxylenes, the areas shown in Figure 2 should be recalculated, or more conveniently Figure 3 should be used. Since styrene is the monomer which will probably be used most often, and since the workers in the art most conveniently refer to weight percentages rather than mole percentages, permitting direct calculation of amounts of the three chosen monomers in weight units, it has been deemed most convenient from the overall standpoint to present Figure 2 in terms of weight percentage styrene, acrylonitrile, and vinyl acetate. This has also been most convenient in presenting on Figure 2 the data of the specific examples. However, vinyltoluene, or vinylxylene, can be used mole for mole in place of styrene in the practice of the invention. In the absence of Figure 3, it would be necessary to re-locate the area EFGH, and the area ABCD, shown in Figure 2, if vinyltoluene or vinylxylene is to be used, since Figure 2 is based on weight percentage styrene. The areas are easily recalculated by methods that will be obvious to those skilled in the art. Thus, for example, if it is desired to prepare a terpolymer of vinyltoluene (the vinyltoluene of course being any single one of the isomeric vinyltoluenes or any mixture of two or more of same), acrylonitrile, and vinyl acetate, corresponding in composition to point 9 on Figure 2, the calculations are made as follows. For styrene, the point in question has the composition 72 weight per cent styrene, 23 weight per cent acrylonitrile, 5 weight per cent vinyl acetate. Using the known molecular weights of these three monomers, this is recalculated to mole basis and the result obtained is styrene 58 mole per cent, acrylonitrile 37.1 mole per cent, vinyl acetate 4.9 mole per cent. Now vinyltoluene is to be used in the same mole proportions, viz. the monomeric mixture will contain vinyltoluene 58 mole per cent, acrylonitrile 37.1 mole per cent, vinyl acetate 4.9 mole per cent. Converting these back to weight percentages gives vinyltoluene 74.2 weight per cent, acrylonitrile 21.2 weight per cent, vinyl acetate 4.6 weight per cent. Thus, it will be seen that the use of the higher molecular weight vinyltoluene in place of styrene results in a composition having a somewhat higher weight percentage of the vinyltoluene than the corresponding composition containing styrene, the mole percentages of the three monomers being the same in both the styrene/acrylonitrile/vinyl acetate composition and the vinyltoluene/acrylonitrile/vinyl acetate composition. In a similar manner, any other points on Figure 2, for example points ABCD and interconnecting points forming together the lines which bound the area ABCD, can be recalculated for vinyltoluene, or for vinylxylene.

For ready reference, the compositions of each of the points A, B, C, D, E, F, G and H are now tabulated in weight percentages, where (a) is styrene, where (a) is vinyltoluene and where (a) is vinylxylene, as well as in mole percentages which of course are the same no matter which of the (a) monomers is involved.

| Point | (a) Monomer | | (b) Acrylonitrile | | (c) Vinyl Acetate | |
|---|---|---|---|---|---|---|
| | Wt. percent | Mole percent | Wt. percent | Mole percent | Wt. percent | Mole percent |
| Styrene | | | | | | |
| A | 70.5 | 55 | 29 | 44.5 | 0.5 | 0.47 |
| B | 58.5 | 46.8 | 21.5 | 33.8 | 20 | 19.4 |
| C | 66.5 | 56.8 | 13.5 | 22.6 | 20 | 20.6 |
| D | 79 | 65.9 | 20.5 | 33.6 | 0.5 | 0.50 |
| E | 66.5 | 50.3 | 33 | 49.2 | 0.5 | 0.47 |
| F | 55 | 42.9 | 25 | 38.2 | 20 | 18.9 |
| G | 69 | 60.2 | 11 | 18.8 | 20 | 21.0 |
| H | 81.5 | 69.4 | 18 | 30.1 | 0.5 | 0.51 |
| Vinyltoluene | | | | | | |
| A | 73.0 | 55 | 26.5 | 44.5 | 0.5 | 0.47 |
| B | 61.5 | 46.8 | 19.9 | 33.8 | 18.6 | 19.4 |
| C | 69.3 | 56.8 | 12.4 | 22.6 | 18.3 | 20.6 |
| D | 81.1 | 65.9 | 18.5 | 33.6 | 0.4 | 0.50 |
| E | 69.1 | 50.3 | 30.4 | 49.2 | 0.5 | 0.47 |
| F | 58.1 | 42.9 | 23.2 | 38.2 | 18.7 | 18.9 |
| G | 71.7 | 60.2 | 10.0 | 18.8 | 18.3 | 21.0 |
| H | 83.3 | 69.4 | 16.3 | 30.1 | 0.4 | 0.51 |
| Vinylxylene | | | | | | |
| A | 75.2 | 55 | 24.4 | 44.5 | 0.4 | 0.47 |
| B | 64.1 | 46.8 | 18.6 | 33.8 | 17.3 | 19.4 |
| C | 71.6 | 56.8 | 11.5 | 22.6 | 16.9 | 20.6 |
| D | 82.7 | 65.9 | 16.9 | 33.6 | 0.4 | 0.50 |
| E | 71.5 | 50.3 | 28.1 | 49.2 | 0.4 | 0.47 |
| F | 60.8 | 42.9 | 21.7 | 38.2 | 17.5 | 18.9 |
| G | 73.9 | 60.2 | 9.3 | 18.8 | 16.8 | 21.0 |
| H | 84.8 | 69.4 | 14.8 | 30.1 | 0.4 | 0.51 |

It is also to be understood that the invention encompasses the use of a mixture of styrene with vinyltoluene, of styrene with vinylxylene, or of styrene with both vinyltoluene and vinylxylene, or of vinyltoluene with vinylxylene, etc., any such mixture being taken in its totality as the (a) monomer in a monomeric mixture consisting of (a) a member of the group consisting of styrene, vinyltoluene, vinylxylene, and mixtures thereof, (b) acrylonitrile, and (c) vinyl acetate. Thus, the description of products of the present invention as terpolymers is taken in its broader meaning so that any mixture of two or more of the (a) monomers is considered as a single monomer component for the purpose of defining a terpolymer. When mixtures of two or more of the named (a) monomers having different molecular weights are employed, the area EFGH, or the area ABCD, etc., in Figure 2 is recalculated by the method described above, first being converted to mole percentages and then the weight percentages being calculated taking into consideration the different molecular weights of the particular (a) monomers which are being used in admixture as the (a) component of the "(a)/(b)/(c) terpolymer."

Unless styrene is the sole material making up the (a) component, it will usually be more convenient to use Figure 3 in which all proportions are shown as mole percentages. It is then unnecessary to go through calculations starting with weight percentage of styrene, and any desired mole percentage composition read from Figure 3 can be directly converted to weight percentages no matter what single monomer or mixture of two or more monomers is used as the (a) component.

The following examples illustrate some methods for practicing the present invention with respect to certain ternary mixtures of monomers. The general applicability of the invention, and advantages thereof, are shown in these examples. It will be appreciated that variations can be made in the particular choice of monomers, proportions, and methods of polymerization in accordance with the general teachings of the present specification, and the examples are not to be taken as coextensive with the invention in its broadest aspects.

EXAMPLES

These examples concern the polymerization of various proportions of the monomers in the ternary system styrene/acrylonitrile/vinyl acetate. The batch polymerizations were effected by the mass polymerization technique without the addition of any catalyst. The data obtained are set forth graphically in Figure 2 of the drawing.

A series of monomeric mixtures was made up, each mixture being prepared by admixture of the individual pure monomers in a "Pyrex" test tube 150 mm. long and having an internal diameter within the approximate range of 14 to 18 mm., usually about 16 mm. Each test tube containing the particular monomeric mixture was flushed with nitrogen in order to remove any air present in the gas space above the liquid, and the test tube was then sealed off at the top by heating the tube under nitrogen and pulling it out in the flame to seal the tube completely. Each particular monomer mixture was prepared and polymerized in duplicate.

After the various tubes containing the monomeric mixtures had been prepared, they were placed in a 90° C. constant temperature bath, and held there for 24 hours. At the end of that period they were moved to a 120° C. constant temperature bath and held there for 24 hours. At the end of this second 24-hour period the tubes were removed and placed in an oven maintained at 180° C. and held therein for 8 hours.

The various monomeric compositions are set forth in detail in Table I. Table I designates each different mixture by a Sample Number. Table I includes data on samples prepared from various binary mixtures of styrene with acrylonitrile; these, when plotted with the ternary data, aid in understanding the limits of the invention.

At the end of the polymerization cycle described above, all the polymers which formed in the sealed tubes were carefully examined visually by the same observer, looking through the diameter of the cylindrical body of polymer obtained by breaking and removing the glass tube; this cylinder of polymer conformed to the internal shape and size of the glass tube. These visual observations were checked by other observers. It was determined that the clarity noted for polymer samples is not significantly affected by variation in polymer cylinder diameter within the range of about 14 to 18 millimeters. It is to be understood that where clarity of polymers is discussed herein, reference is made to the appearance on looking through a cylindrical body of the polymer having a diameter within the approximate range of 14 to 18 millimeters. The following words were adopted for describing the clarity of polymers.

C. Clear—essentially crystal clear.
H. Hazy—some cloudiness, but slight.
T. Turbid—moderately cloudy; very hazy.
O. Opaque — dense cloudiness — similar to milk.

"Clear" means relatively free from gross amounts of haze but allows the presence of slight haze to be detected with close examination in strong light.

*Table I*

STYRENE/ACRYLONITRILE/VINYL ACETATE TERPOLYMERS

| Sample No. | Composition, Wt. Percent, V/A/S | Appearance | | Acrylonitrile in Polymer, Wt. Percent | Alcohol Solubles Content, Percent | Specific Viscosity | |
|---|---|---|---|---|---|---|---|
| | | Clarity | Color | | | Orig. | Res. |
| 1 | 5/35/60 | O—Opaque | Yellow | | | | |
| 2 | 5/30/65 | H—Hazy | do | | | | |
| 3 | 5/25/70 | C—Clear | do | 28.8 | 8.12 | 0.231 | 0.257 |
| 4 | 5/20/75 | H—Hazy | Pale yellow | 23.5 | 7.75 | 0.194 | 0.202 |
| 5 | 5/15/80 | O—Opaque | Colorless | 18.3 | 8.54 | 0.159 | 0.174 |
| 6 | 5/29/66 | H—Hazy | White | | | | |
| 7 | 5/27/68 | C—Clear | Yellow | | | | |
| 8 | 5/25/70 | do | Slightly yellow | 26.1 | | | |
| 9 | 5/23/72 | do | Pale yellow | | | | |
| 10 | 5/21/74 | do | Colorless (v. sl. yellow) | 21.8 | | | |
| 11 | 0/28/72 | do | Colorless | 20.3 | | | |
| 12 | 10/27/63 | H—Hazy | do | | | | |
| 13 | 10/25/65 | C—Clear (sl. hazy) | Yellow | | | | |
| 14 | 10/23/67 | C—Clear (v. sl. hazy) | do | | | | |
| 15 | 10/21/69 | do | Pale yellow | 12.06 | 0.176 | 0.187 | |
| 16 | 10/19/71 | do | Very pale yellow | 12.73 | 0.158 | 0.177 | |
| 17 | 10/17/73 | H—Hazy | Colorless | 12.12 | 0.150 | 0.163 | |
| 18 | 10/15/75 | T—Turbid | do | 11.94 | 0.139 | 0.160 | |
| 19 | 15/21/74 | C—Clear (v. sl. hazy) | do | | | | |
| 20 | 15/19/66 | do | Slightly yellow | | | | |
| 21 | 15/17/68 | do | do | 16.02 | 0.143 | 0.222 | |
| 22 | 15/15/70 | do | Very slightly yellow | 16.54 | 0.138 | 0.154 | |
| 23 | 15/13/72 | H—Hazy | Colorless | | | | |
| 24 | 0/35/65 | T—Turbid | do | | | | |
| 25 | 0/30/70 | do | Light yellow | | | | |
| 26 | 0/24/76 | H—Hazy | Colorless (v. sl. yellow) | | | | |
| 27 | 0/21/79 | C—Clear | Colorless | | | | |
| 28 | 0/20/80 | do | do | | | | |
| 29 | 0/15/85 | H—Hazy | White | | | | |
| | | O—Opaque | do | | | | |

V=vinyl acetate.
A=acrylonitrile.
S=styrene.
Sample 8—Check Sample 3.
Acrylonitrile in polymer, wt. percent—calculated from nitrogen analysis of polymer.
Alcohol solubles content, percent—weight percentage of polymer soluble in methanol.
Specific viscosity—0.1 weight percent polymer in dimethylformamide.
Orig.=original polymer before extraction of alcohol solubles.
Res.=residual polymer after extraction of alcohol solubles.
v.=very.
sl.=slightly.

The clarity data given in Table I are shown in Figure 2 of the drawing. As mentioned before, Figure 2 is the top half of a conventional triangular coordinate graph, which is shown in broad outline in Figure 1 and constitutes an equilateral triangle each apex of which represents 100 weight per cent of one of the three monomers. In the said coordinate graph, of which Figure 1 represents the whole, and Figure 2 represents only a part, the top apex designates 100 per cent styrene, the lower left apex (Figure 1) designates 100 percent acrylonitrile, and the lower right apex (Figure 1) designates 100 per cent vinyl acetate. Any single point within the graph designates a single percentage of each of the three monomers which percentages added together equal 100 per cent. The shortest distance from any apex to the side of the equilateral triangle opposite the apex represents all proportions of the monomer for which that apex is designated, ranging from 100 per cent at the apex to 0 per cent at the opposite side. If the whole triangular coordinate graph be considered to be divided by a series of lines running parallel to the side opposite that apex in question, into 100 equidistant parts, then each of said lines represents an integer percentage of the designated monomer. Similar considerations govern for the other two monomers, so that by a series of intersecting lines a grid-work of equilateral triangles is established within the entire graph so that it is simple to see at a glance the percentage of each monomer indicated by a point anywhere within the graph. Figure 2 represents only the top half of such a triangular coordinate graph, i. e., no values of styrene below 50 weight per cent are shown in Figure 2. Thus, the top apex in Figure 2 represents 100 weight per cent styrene, the lower left apex represents 50 weight per cent acrylonitrile, and the lower right apex represents 50 weight per cent vinyl acetate. For simplicity, the grid-work within the triangle has been limited to a series of lines the spacing between each two parallel lines representing 2.5 weight per cent. Numerals running around the margin of Figure 2 show the manner in which the weight per cent of each of the monomers varies.

In Figure 2, the clarity data given in Table I have been designated along side each of the corresponding ternary monomeric mixture compositions indicated by a point on the portion of the triangular coordinate graph shown in the figure. The various numerals on Figure 2 located adjacent the respective points refer to the sample number in Table I. All of the points marked "C" were rated as clear; of these point 13 was slightly hazy and points 14, 15, 16, 19, 20 and 21 were very slightly hazy, but not sufficient to consider them other than essentially clear or to bring them from the clear rating into the hazy rating.

Examination of Figure 2 immediately shows that the clear terpolymers appear as a group within only a very restricted range of monomer compositions. Outside that range with either increasing styrene content or increasing acrylonitrile content, lie terpolymers that are hazy. Still beyond those hazy terpolymers are those which are turbid and opaque. The area of monomeric mixtures which on batch polymerization give clear terpolymers is outlined on Figure 2 by the lines ABCD. Monomers made from monomeric mixtures lying approximately within the area ABCD are the preferred products of the present invention. However, the invention in its broader aspects encompasses these materials and also the hazy terpolymers made from monomeric compositions lying within the broader area EFGH on Figure 2. It will be noted that the line AD and the line EH which includes line AD, is established at 0.5 weight per cent vinyl acetate; however, the use of smaller proportions of vinyl acetate to obtain some of the advantages of this invention is not to be considered outside the broad scope and spirit of the invention. It will ordinarily be found that at least 0.5 weight per cent vinyl acetate should be used to result in terpolymers which show positive effects of the presence of vinyl acetate. It will also be noted that the line BC and the line FG which includes line BC, has been established at 20 weight per cent vinyl acetate.

Examination of the data in Table I shows that the alcohol solubles content of the polymer increases in almost direct ratio to the percentage vinyl acetate used. Since for most purposes the alcohol solubles content should not be too high, terpolymers made from monomeric mixtures containing not over 20 weight per cent vinyl acetate will be employed for most purposes. However, here again it is not outside the broad scope and spirit of the invention to employ vinyl acetate in amounts larger than 20 weight per cent and still retain some of the advantages of the present invention. It will sometimes be desirable to remove the low molecular weight material from the total product, as by extraction with methanol or other solvent, and employ the insoluble resin for the intended use.

The data in Table I also show a relationship between the percentage vinyl acetate and the molecular weight of the resulting polymer. Thus, the larger the proportion of vinyl acetate, the lower the molecular weight, both as determined by the viscosity of the total product, and by the viscosity of the polymer after removal of alcohol solubles therefrom. It may be noted that the specific viscosity of the alcohol solubles residue for Sample 20 is not consistent with the rest of the data and probably represents an experimental error. Thus, the end use of the polymer will determine the choice of proportion of vinyl acetate to be employed. The use of 5 per cent vinyl acetate and even less gives a terpolymer which is considerably softer than binary polymer made from proportions of styrene and acrylonitrile similar to those of the terpolymer, and thus more flexible films can be formed from the terpolymers than from the binary copolymers.

While this invention has been described herein with particular reference to various preferred embodiments thereof, and examples have been given of suitable materials, proportions and conditions, it will be appreciated that variations from the details given herein can be effected without departing from the invention.

I claim:

1. Interpolymer prepared by free-radical-initiated batch polymerization of a monomeric mixture consisting of (a) a member of the group consisting of styrene, vinyltoluene, vinylxylene, and mixtures thereof, (b) acrylonitrile and (c) vinyl acetate, the proportions of (a), (b) and (c) in said monomeric mixture being within the approximate area EFGH in Figure 3.

2. Interpolymer according to claim 1 prepared by mass polymerization.

3. Interpolymer according to claim 1 wherein (a) is styrene.

4. Interpolymer according to claim 1 wherein (a) is a vinyltoluene.

5. Interpolymer according to claim 1 wherein (a) is a vinylylene.

6. Interpolymer according to claim 1 wherein (a) is a mixture of styrene and a vinyltoluene.

7. Interpolymer according to claim 1 wherein (a) is a mixture of isomeric vinyltoluenes.

8. Clear interpolymer prepared by free-radical-initiated batch polymerization of a monomeric mixture consisting of (a) a member of the group consisting of styrene, vinyltoluene, vinylxylene, and mixtures thereof, (b) acrylonitrile and (c) vinyl acetate, the proportions of (a), (b) and (c) in said monomeric mixture being within the approximate area ABCD in Figure 3.

9. Interpolymer according to claim 8 prepared by mass polymerization.

10. Interpolymer according to claim 8 wherein (a) is styrene.

11. Interpolymer according to claim 8 wherein (a) is a vinyltoluene.

12. Interpolymer according to claim 8 wherein (a) is a vinylxylene.

13. Clear terpolymer prepared by free-radical-initiated batch polymerization of a monomeric mixture consisting of styrene, acrylonitrile, and vinyl acetate, the proportions of the monomers in said monomeric mixture being within the approximate area ABCD in Figure 2 but the vinyl acetate content of said monomeric mixture being limited to from about 5 to about 15 weight per cent vinyl acetate.

14. A polymerization process which comprises forming a monomeric mixture consisting of (a) a member of the group consisting of styrene, vinyltoluene, vinylxylene, and mixtures thereof, (b) acrylonitrile and (c) vinyl acetate, the proportions of (a), (b) and (c) in said monomeric mixture being within the approximate area EFGH in Figure 3, and subjecting a batch of said monomeric mixture to free-radical-initiated batch polymerization forming a homogeneous high molecular weight interpolymer whose appearance is within the range of clear to hazy.

15. A polymerization process which comprises forming a monomeric mixture consisting of (a) a member of the group consisting of styrene, vinyltoluene, vinylxylene, and mixtures thereof, (b) acrylonitrile and (c) vinyl acetate, the proportions of (a), (b) and (c) in said monomeric mixture being within the approximate area ABCD in Figure 3, and subjecting a batch of said monomeric mixture to free-radical-initiated batch mass high conversion polymerization forming an essentially clear homogeneous high molecular weight interpolymer.

16. A process according to claim 15 wherein (a) is styrene.

17. A process according to claim 16 wherein the vinyl acetate content of said monomeric mixture is limited to from about 5 to about 15 weight per cent.

References Cited in the file of this patent

FOREIGN PATENTS 597,368    Great Britain _____ Jan. 23, 1948